United States Patent
Luo et al.

(10) Patent No.: US 11,345,353 B2
(45) Date of Patent: May 31, 2022

(54) VEHICLE OCCUPANT DETECTION

(71) Applicant: Ford Global Technologies, LLC, Dearborn, MI (US)

(72) Inventors: Dawei Luo, Dearborn, MI (US); Jianbo Lu, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 195 days.

(21) Appl. No.: 16/500,831

(22) PCT Filed: Aug. 11, 2017

(86) PCT No.: PCT/US2017/046535
§ 371 (c)(1),
(2) Date: Oct. 4, 2019

(87) PCT Pub. No.: WO2018/186899
PCT Pub. Date: Oct. 11, 2018

(65) Prior Publication Data
US 2020/0122732 A1     Apr. 23, 2020

Related U.S. Application Data

(60) Provisional application No. 62/482,147, filed on Apr. 5, 2017.

(51) Int. Cl.
*B60W 40/08*     (2012.01)
(52) U.S. Cl.
CPC ..... *B60W 40/08* (2013.01); *B60W 2040/0881* (2013.01)

(58) Field of Classification Search
CPC .......... B60W 40/08; B60W 2040/0881; B60R 21/01; B60N 2/002
USPC ........................................... 701/32
See application file for complete search history.

(56) References Cited

U.S. PATENT DOCUMENTS

| | | | |
|---|---|---|---|
| 5,038,135 A * | 8/1991 | Jurkiewicz | B60R 16/023 340/457 |
| 6,012,007 A * | 1/2000 | Fortune | G06K 9/00362 701/45 |
| 7,788,063 B2 | 8/2010 | Bodin et al. | |

(Continued)

FOREIGN PATENT DOCUMENTS

| CN | 105083212 A | 11/2015 |
|---|---|---|
| DE | 10009540 A1 | 9/2001 |

(Continued)

OTHER PUBLICATIONS

International Search Report and Written Opinion dated Nov. 6, 2017 re Appl. No. PCT/US2017/046535.

(Continued)

*Primary Examiner* — Jonathan M Dager
*Assistant Examiner* — Jean W Charleston
(74) *Attorney, Agent, or Firm* — Brandon Hicks; Bejin Bieneman PLC

(57) ABSTRACT

A computer in a vehicle that includes a processor and memory storing instructions executable by the processor. The instruction may include: receive an indication that the vehicle door is ajar; receive sensor data from a rotational-rate sensor in a vehicle; and based on the indication and sensor data, determine a traversal event.

20 Claims, 11 Drawing Sheets

(56) References Cited

U.S. PATENT DOCUMENTS

| | | | |
|---|---|---|---|
| 8,422,693 B1* | 4/2013 | Daily | H04R 5/02 381/86 |
| 8,991,545 B2 | 3/2015 | Furst | |
| 2006/0044127 A1* | 3/2006 | Ho | G08B 21/24 340/457 |
| 2008/0040005 A1* | 2/2008 | Breed | H01H 35/146 701/48 |
| 2012/0050021 A1* | 3/2012 | Rao | B60R 99/00 340/425.5 |
| 2015/0329079 A1* | 11/2015 | Van Wiemeersch | B60R 25/1004 340/426.26 |
| 2016/0337814 A1 | 11/2016 | Van Wiemeersch | |
| 2017/0144595 A1* | 5/2017 | Rovinsky | B60Q 9/00 |
| 2017/0249797 A1* | 8/2017 | Elie | E05F 15/40 |
| 2018/0147955 A1* | 5/2018 | Fujii | B60N 2/002 |
| 2018/0253959 A1* | 9/2018 | Andrade | G08B 21/24 |
| 2020/0122732 A1* | 4/2020 | Luo | B60W 40/08 |

FOREIGN PATENT DOCUMENTS

| | | |
|---|---|---|
| DE | 102011118704 A1 | 5/2013 |
| DE | 102014200195 A1 | 7/2015 |
| DE | 102014214926 A1 | 2/2016 |

OTHER PUBLICATIONS

CN Notification of First Office Action dated Aug. 27, 2021; re Appl. No. 2017800893906.

* cited by examiner

VEHICLE OCCUPANT DETECTION

CROSS-REFERENCE TO RELATED APPLICATION(S)

The subject patent application claims priority to and all the benefits of U.S. Provisional Patent Application No. 62/482,147 filed on Apr. 5, 2017, which is herein incorporated by reference in its entirety.

BACKGROUND

Vehicle occupancy sensors include seat sensors, seatbelt sensors, and cameras. For example, seat sensors may be embedded or integral to a seat base or seat back and detect weight, pressure, proximity, etc. Seatbelt sensors can detect a latched condition based on a location of a seat belt clip relative to a seat belt buckle. And a camera and image processing software can be used to image an interior of a vehicle and determine whether an occupant is present.

DETAILED DESCRIPTION

Figure 1:
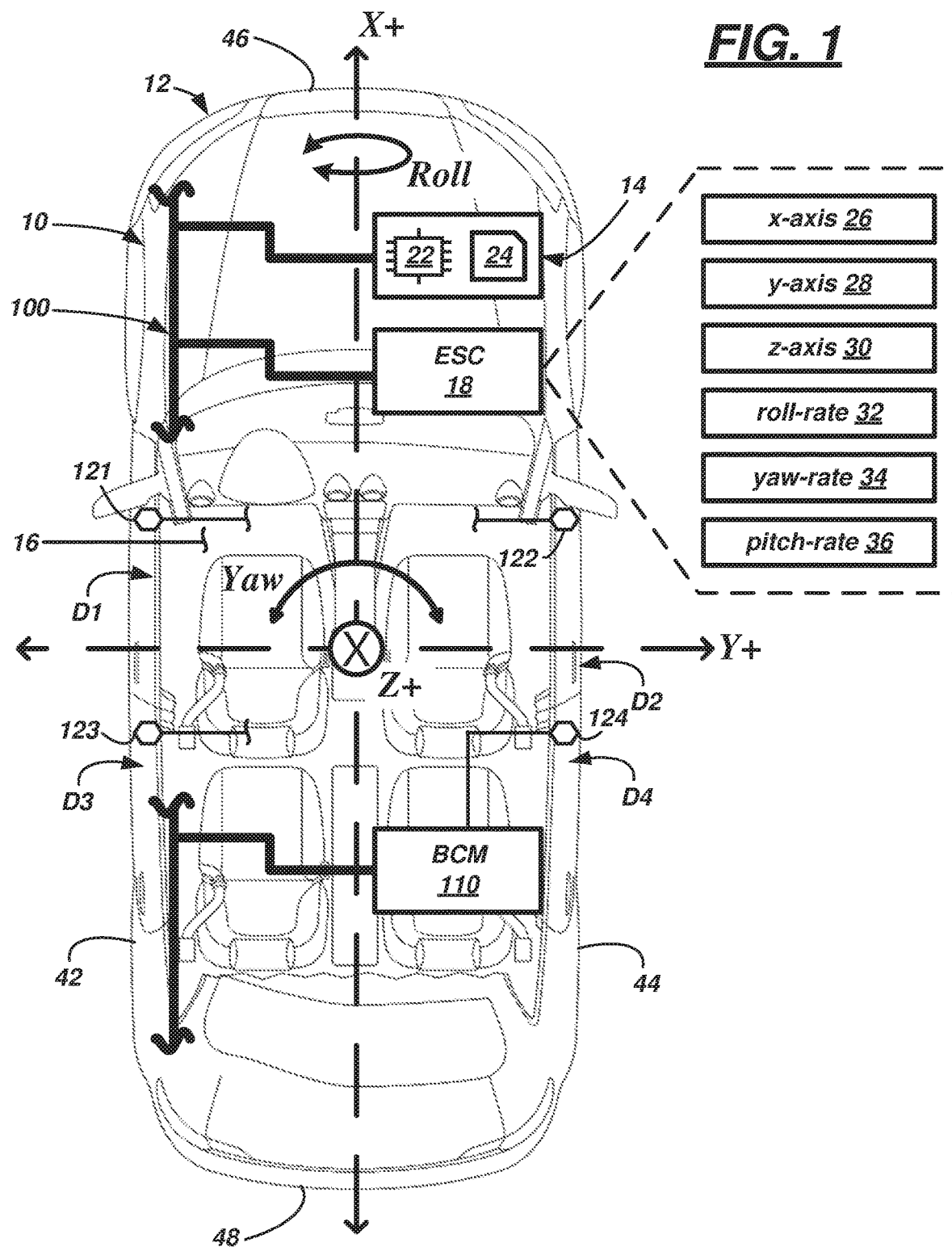
FIG. 1 is a schematic diagram of a vehicle having an occupant detection system that includes a computer and one or more sensors.

An occupant detection system is described that includes a vehicle computer and one or more vehicle sensors. According to one illustrative example, computer can be programmed to: receive an indication that a vehicle door is ajar; receive sensor data from a rotational-rate sensor in a vehicle, based on the indication and sensor data, determine a traversal event.

According to the at least one example set forth above, the indication includes sensor data received via another sensor located at the door.

According to the at least one example set forth above, the indication is received from a body control module coupled to a plurality of door-ajar sensors, wherein each door-ajar sensor is associated with one of a plurality of vehicle doors.

According to the at least one example set forth above, the data is received by the computer in response to the indication.

According to the at least one example set forth above, the computer further is programmed to determine a window of interest with respect to the sensor data, wherein the window of interest is defined by a time interval associated with when the vehicle door is ajar.

According to the at least one example set forth above, the computer further is programmed to determine a rotational indicator from the data, wherein the rotational indicator is indicative of the traversal event.

According to the at least one example set forth above, the computer further is programmed to determine the traversal event based on the rotational indicator being greater than a first threshold or less than a second threshold.

According to the at least one example set forth above, the computer further is programmed to ignore a rotational indicator from the data that is indicative of the traversal event when the rotational indicator is coincident with a terminal point of the window of interest or when the rotational indicator is within a threshold time interval of the terminal point.

According to the at least one example set forth above, the rotational-rate sensor is positioned and oriented in the vehicle to measure roll-rate of the vehicle with respect to a longitudinal axis thereof.

According to the at least one example set forth above, the computer further is programmed to: receive sensor data from a second rotational-rate sensor and an accelerometer; and execute dynamic vehicle model instructions using sensor data from the first rotational-rate sensor, the second rotational-rate sensor, and the accelerometer.

According to the at least one example set forth above, the computer further is programmed to: determine a weight indicator using the model instructions; determine whether the weight indicator is greater than a threshold; and determine the traversal event when the weight indicator is greater than the threshold.

According to the at least one example set forth above, the first rotational-rate sensor is positioned and oriented in the vehicle to measure roll-rate of the vehicle with respect to a longitudinal axis thereof, wherein the second rotational-rate sensor is positioned and oriented in the vehicle to measure pitch-rate of the vehicle with respect to a lateral axis thereof, wherein the accelerometer is positioned and oriented in the vehicle to measure movement along a vertical axis of the vehicle.

According to the at least one example set forth above, the traversal event comprises one of an occupant ingress event or an occupant egress event.

According to the at least one example set forth above, the computer further is programmed to increment or decrement a counter based on determining the traversal event, wherein, when the computer determines an occupant ingress event, the computer is programmed to increment the counter, and wherein, when the computer determines an occupant egress event, the computer is programmed to decrement the counter.

According to the at least one example set forth above, wherein the sensor is part of a roll stability control system in the vehicle.

According to another illustrative example, a system includes: a first rotational-rate sensor, wherein the first rotational-rate sensor a motion sensing system in a vehicle; and a computer, programmed to: receive an indication that a vehicle door is ajar; receive sensor data from the sensor; and based on the indication and sensor data, determine a traversal event.

According to the at least one example set forth above, the system further includes a door-ajar sensor associated with one of a plurality of vehicle doors, wherein the indication is received by the computer via the door-ajar sensor.

According to the at least one example set forth above, the computer further is programmed to determine a window of interest with respect to the sensor data, wherein the window of interest is defined by a time interval associated with when the vehicle door is ajar, wherein the computer further is programmed to determine a rotational indicator from the data, wherein the rotational indicator is indicative of the traversal event.

According to the at least one example set forth above, the first rotational-rate sensor is positioned and oriented in the vehicle to measure roll-rate of the vehicle with respect to a longitudinal axis thereof, wherein the motion sensing system further comprises a second rotational-rate sensor and an accelerometer, wherein the second rotational-rate sensor is positioned and oriented in the vehicle to measure pitch-rate of the vehicle with respect to a lateral axis thereof, wherein the accelerometer is positioned and oriented in the vehicle to measure movement along a vertical axis of the vehicle.

According to the at least one example set forth above, the computer further is programmed to: receive sensor data from the second rotational-rate sensor and the accelerometer; and execute dynamic vehicle model instructions using sensor data from the first rotational-rate sensor, the second rotational-rate sensor, and the accelerometer, wherein the computer further is programmed to: determine a weight indicator using the model instructions; determine whether the weight indicator is greater than a threshold; and determine the traversal event when the weight indicator is greater than the threshold.

According to the at least one example, a computer is disclosed that is programmed to execute any combination of the examples set forth above.

According to the at least one example, a computer program product is disclosed that includes a computer readable medium storing instructions executable by a computer processor, wherein the instructions include any combination of the instruction examples set forth above.

Now turning to the figures, wherein like numerals indicate like parts throughout the several views, there is shown an occupant detection system 10 for a vehicle 12 that includes a computer 14 that receives sensor data from a plurality of sensors—at least one of the sensors being a rotational-rate sensor—and based on this sensor data determines whether a user is ingressing or egressing a cabin 16 of the vehicle 12. The computer 14 further can determine using these signals a quantity of occupants within the cabin 16. In at least one example, the sensors are part of an existing, onboard motion sensing system 18; accordingly, computer 14 may determine ingress and egress events (as well as the number of occupants in the vehicle 12) without requiring significant changes or additional vehicle hardware. For example, the proposed occupant detection system 10 may utilize a set of instructions implemented in software, firmware, or the like to determine vehicle ingress and egress events, thereby minimizing costs.

According to at least one example, the vehicle 12 may be a fully autonomous taxi-vehicle, which charges a taxi fee to occupants. The fee may be based, at least in part, on a quantity of occupants carried thereby and/or the distance traversed from point-to-point carrying the occupants. For example, in fully-autonomous implementations, the vehicle 12 may have neither a human driver nor an attendant traveling with the vehicle 12 (e.g., where the driver or attendant is present, the driver or attendant may determine the quantity of occupants, an accurate total fee for the taxi service, etc.). In fully-autonomous implementations, computer 14 may be configured to perform such tasks. And as described below, computer 14 may be programmed to perform other suitable taxi functions.

Figure 2:
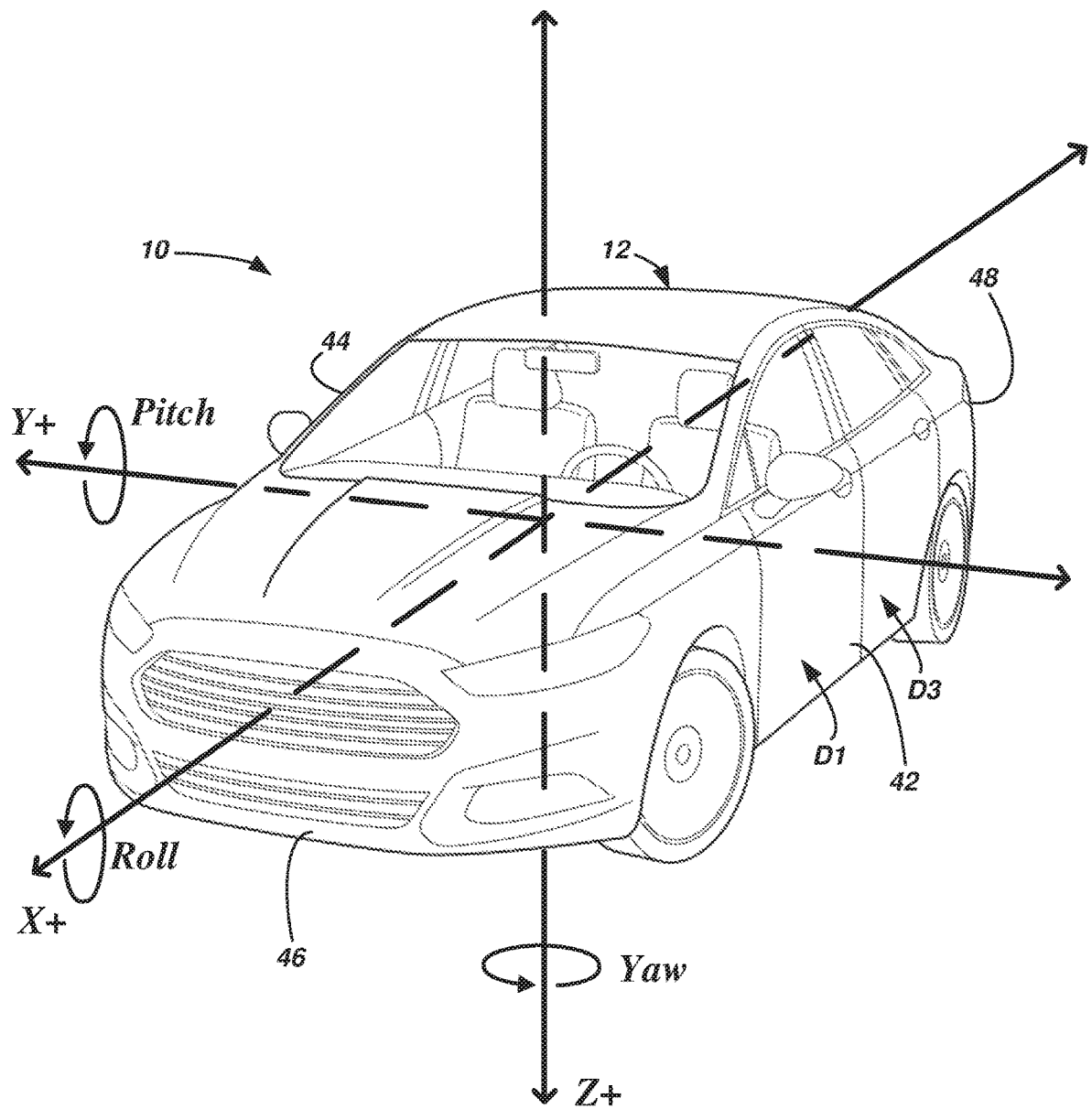
FIG. 2 is a perspective view of the vehicle, illustrating a vehicle coordinate system.

In FIGS. 1-2, vehicle 12 is shown as a passenger car; however, vehicle 12 could also be a truck, sports utility vehicle (SUV), recreational vehicle, other human transports, or the like that includes the occupant detection system 10. Further, vehicle 12 may be operated in any suitable quantity of autonomous modes. For example, vehicle 12 may be operable in a fully autonomous mode (e.g., having a level 5 autonomy), as defined by the Society of Automotive Engineers (SAE) (which has defined operation at levels 0-5). For example, at levels 0-2, a human driver monitors or controls a majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention.

Computer 14 may be a single computer (or multiple computing devices—e.g., shared with other vehicle systems and/or subsystems). Computer 14 may comprise a processor or processing circuit 22 coupled to memory 24. For example, processor 22 can be any type of device capable of processing electronic instructions, non-limiting examples including a microprocessor, a microcontroller or controller, an application specific integrated circuit (ASIC), etc.—just to name a few. In general, computer 14 may be programmed to execute digitally-stored instructions, which may be stored in memory 24, which enable the computer 14, among other things, to receive sensor data from one or more vehicle sensors; receive an indication that a vehicle door is ajar; determine that a user is ingressing or egressing vehicle 12 using at least some of the sensor data; update a counter that is tracking the quantity of occupants within the vehicle cabin 16; and the like.

Memory 24 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. As discussed above, memory 24 may store one or more computer program products which may be embodied as software, firmware, or the like (e.g., such as software applications).

According to one example, sensor data is received from the motion sensing system 18. System 18 may be adapted to receive sensor data from one or more vehicle systems, including but not limited to a roll stability control system, an electronic stability control system, an advanced stability control system, an inertial navigation system (e.g., for a fully autonomous vehicle), an anti-lock brake system, the like, or a combination thereof. For example, system 18 may detect a loss of vehicle roll stability (e.g., due to abrupt steering changes at high speed) and, in response to such detection, may apply automatically vehicle brakes to counteract the vehicle's roll. System 18 may include a first accelerometer 26, a second accelerometer 28, a third accelerometer 30, a first rotational-rate sensor 32 (e.g., a roll-rate sensor), a second rotational-rate sensor 34 (e.g., a yaw-rate sensor), a third rotational-rate sensor 36 (e.g., a pitch-rate sensor), and the aforementioned motion sensing computer. In some examples, all or some of sensors 26-36 may be packaged into a common cluster (e.g., that comprises a so-called inertial measurement unit (IMU). Locations of sensors 26-36 may be distributed or within a centralized location of vehicle 12. Regardless of whether sensors 26-36 are implemented in a single device or not, these sensors may be aligned respectively with a first vehicle axis (e.g., labeled axis 'x') that extends a length of vehicle 12 (e.g., a longitudinal axis along a vehicle centerline), a second vehicle axis (e.g., labeled axis 'y' that is normal to the x-axis and that extends laterally or transversely across vehicle 12 (e.g., a lateral axis)), and a third vehicle axis (e.g., labeled axis 'z' that is normal to the x- and y-axes (e.g., a vertical axis)). According to one example, an origin of the longitudinal, lateral, and vertical axes is coincident with a vehicle center of gravity (CG); however, this is not required (e.g., other origin locations are also possible).

A rotational-rate sensor may be a sensor that provides an electrical, magnetic, optical, or other suitable output based on a change in rotational position (about an axis) per unit time. The rotational-rate sensors 32-36 may be gyroscopic sensors, piezoelectric sensor, the like, or any combination thereof. According to at least one example, rotational-rate sensor 32 is positioned and oriented to provide an output regarding rotation around or with respect to the x-axis—e.g., roll about the x-axis. And according to at least one example, rotational-rate sensor 34 is positioned and oriented to provide an output regarding rotation around or with respect to the z-axis—e.g., yaw about the z-axis. And according to at least one example, rotational-rate sensor 36 is positioned and oriented to provide an output regarding rotation around or with respect to the y-axis—e.g., pitch about the y-axis. The system 18 may comprise other sensors and devices not listed here as well—e.g., including but not limited to wheel-speed sensors, steering-angle sensors, and the like, as known in the art.

As shown in FIG. 1—and for explanatory purposes only—a vehicle-forwardly direction (e.g., along the x-axis) may be considered a positive direction, a vehicle-starboardly direction (e.g., along the y-axis) may be considered a negative direction, and a vehicle-downwardly direction (e.g., along the z-axis) may be considered a negative direction. Also, for explanatory purposes only, a rotation or roll with respect to the x-axis may be considered a roll in a positive direction when a vehicle port side 42 rolls upwardly while a vehicle starboard side 44 rolls downwardly. Similarly, for explanatory purposes only, a rotation or pitch along the y-axis may be considered moving in a positive direction when a vehicle front side 46 pitches downwardly while a vehicle rear side 48 pitches upwardly.

As also shown in FIG. 1, occupant detection system 10 may have other components (besides computer 14 and sensors 26-36), including but not limited to a vehicle network connection 100 and an electronic control module 110 (e.g., shown here as a body control module (BCM)). Vehicle network connection 100 may include any suitable wired or wireless intra-vehicle communication network enabling communication between electronic devices such as computer 14, system 18, body control module 110, and the like.

In at least one example, the connection 100 includes one or more of a controller area network (CAN) bus, Ethernet, Local Interconnect Network (LIN), a fiber optic connection, or the like. Other examples also exist. For example, alternatively or in combination with e.g., a CAN bus, connection 100 could comprise one or more discrete wired or wireless connections.

Body control module 110 may include a computing device having a processor and memory (not shown). The processor and memory of BCM 110 may be similar to the processor 22 and memory 24 described above, except that the memory of BCM 110 may store instructions unique to the BCM 110, which when executed by the processor of the BCM 110, cause the BCM 110 to carry out at least some functions which are unique to the BCM 110. Non-limiting examples of a BCM functions include monitoring and/or controlling electronic accessories in vehicle 12 such as power windows, power mirrors, a climate control system, a vehicle immobilizer system, vehicle door locks, and the like. In at least one example, BCM 110 receives sensor data from one or more sensors 121, 122, 123, 124 located at each of the vehicle doors, and this sensor data is indicative of whether a respective door is at least partially ajar. As will be explained in greater detail below, when one of vehicle doors D1, D2, D3, D4 is determined to be ajar, computer 14 may determine whether occupants are ingressing or egressing vehicle 12 (using at least one of sensors 26-36). Doors D1-D4 are exemplary; more or fewer doors may be used in other examples. Sensors 121-124 may be proximity sensors, contact sensors, imaging devices, or any other suitable sensors that may be used by BCM 110, computer 14, and/or another computing device to determine that a vehicle door is ajar and/or open sufficient to permit a traversal event (e.g., an event wherein a user traverses into or out of the vehicle 12). Thus, as used herein, a traversal event includes at least one of an occupant ingress event or an occupant egress event. As used herein, an occupant ingress event is an occurrence of a vehicle user (e.g., a human) entering or boarding vehicle 12 (e.g., entering the cabin 16). And as used herein, an occupant egress event is an occurrence of a vehicle user (e.g., the same or a different human) exiting or alighting the vehicle 12 (e.g., exiting the cabin 16).

Further, in the description set forth above, the computer 14, BCM 110, and system 18 were described as separate computing devices or systems, each coupled to one another via network connection 100; however, other examples exist. For instance, in at least one example, computer 14 and BCM 110 are integral with one another—e.g., being the same device. In other examples, computer 14 could include the hardware and/or functionalities of BCM 110, system 18, or any combination thereof.

Figure 3:
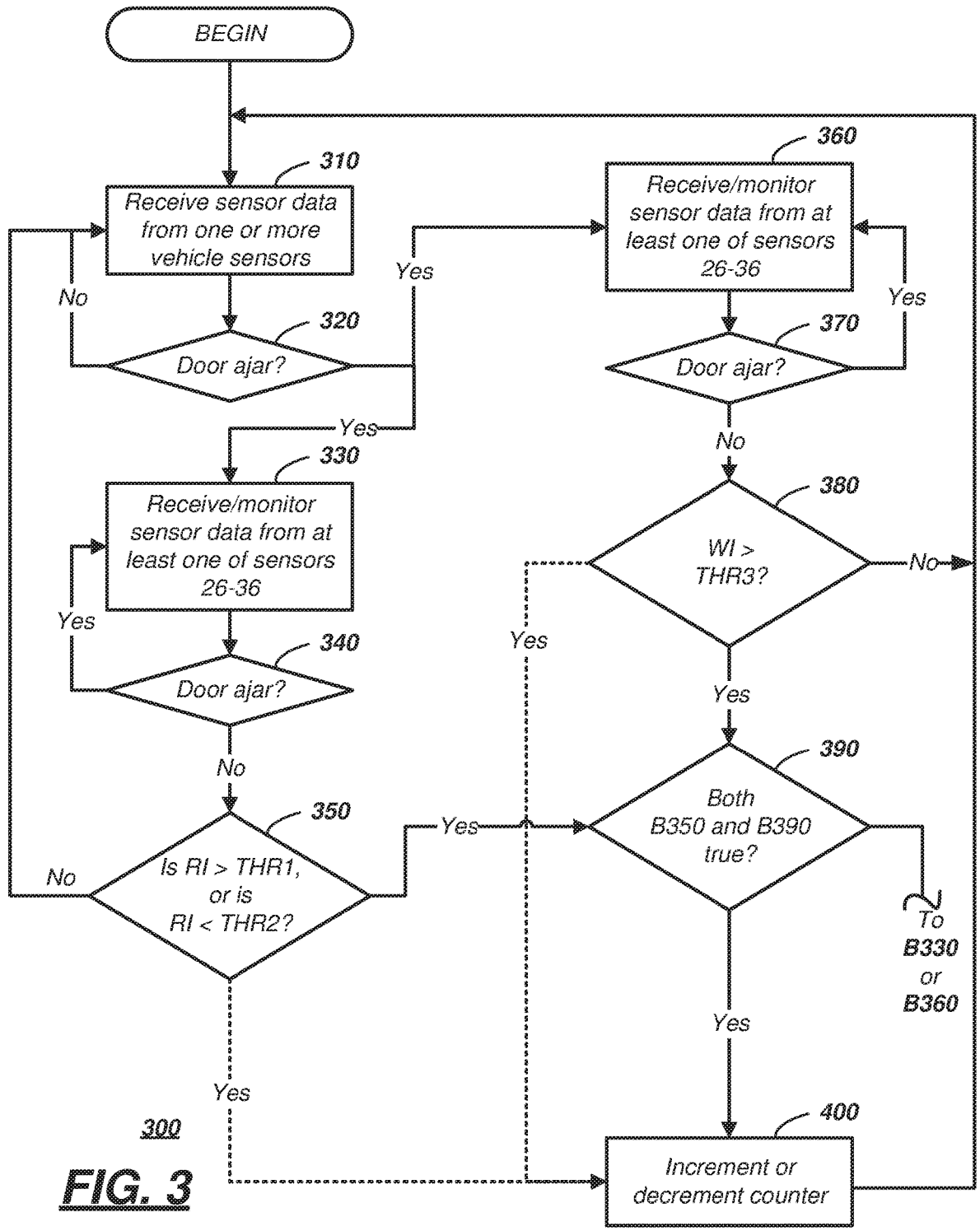
FIG. 3 is a flow diagram illustrating a process of determining an occupant traversal event.

FIG. 3 illustrates a process 300 of using the occupant detection system 10 to determine whether a user is ingressing or egressing the vehicle 12. The process begins with block 310, wherein computer 14 receives digital and/or analog sensor data from one or more of vehicle sensors 26-36, 121-124. In at least one example, computer 14 may monitor sensor data from at least the door-ajar sensors 121-124, and when computer 14 receives an indication that at least one of doors D1-D4 is ajar, then computer may be triggered to monitor sensor data from one or more of sensors 26-36 to determine whether an occupant ingress event and/or an occupant egress event has occurred or is occurring.

Thus, according to one example of block 310, computer 14 may receive sensor data from each of sensors 121-124. And in one example, a digital one ('1') or the like may be indicative of a state wherein the respective door is ajar, whereas a digital zero ('0') or the like may be indicative of a state wherein the respective door is closed. (Of course, the vice-versa implementation is also possible.) To illustrate block 310, consider the example of sensor 121 (associated with vehicle door D1) sending a digital '1' to computer 14 indicating that door D1 is ajar. Alternatively, or in combination therewith, sensor 121 could send the same signal to the BCM 110, which in turn communicates this state to computer 14 via network connection 100. (Note: hereafter, sensors 26-36, 121-124 may be described as communicating directly with computer 14, wherein it will be understood that the sensor data may pass through other modules and systems before reaching computer 14—e.g., including but not limited passing through the BCM 110 and/or the system 18.)

In block 320, computer 14 may determine whether the state of one of the vehicle doors is ajar. Continuing with the example set forth above, in block 320, computer 14 determines that the state of door D1 is ajar based on the sensor data from sensor 121 (e.g., a digital '1'). Thus, according to one example, process 300 proceeds to block 330. Alternatively, if in block 320 computer 14 determines that the state of all doors D1-D4 is closed, then process 300 may loop back and repeat block 310—e.g., continuing to receive sensor data, as described above.

In block 330, computer 14 may monitor and/or receive sensor data from at least one of sensors 26-36—e.g., based on the door ajar state determined in block 320. Sensor data may be passed through any suitable filter—e.g., such as a low-pass filter (e.g., this may occur via a filtering circuit (not shown) in computer 14 or via software). Alternatively, or in combination with low-pass filtering in block 330, such filtering could be carried out in block 350, as described below.

Continuing with the example above, in block 330, computer 14 may monitor the sensor data from roll-rate sensor 32 while the door ajar signal (or an indication thereof) is high (e.g., a digital '1'). This sensor data may be indicative of an angular velocity with respect to a time quantity. Further, this sensor data may be monitored as it is received (e.g., so-called real-time monitoring), stored on memory 24 for later computer processing, or the like. As described more below, computer 14 may evaluate sensor data from sensor 32 to determine whether any rotational indicators (RI) are present. Rotational indicators (RI) may be electrical signal peaks (e.g., a current or voltage spikes) indicating a rotational input to vehicle 12 (e.g., based on a rotational input to a gyroscopic sensor (such as sensor 32) or the like), as also discussed below). Thus, the rotational indicators (RIs) may include a measurable desired signal within a total electrical signal (e.g., received from sensor 32), wherein the total electrical signal—filtered or otherwise—comprises the desired signal plus a so-called noise floor—e.g., the desired signal may have an amplitude suitably larger than the noise (e.g., having a signal-to-noise ratio of 2:1, 3:1, or the like).

Figure 4:
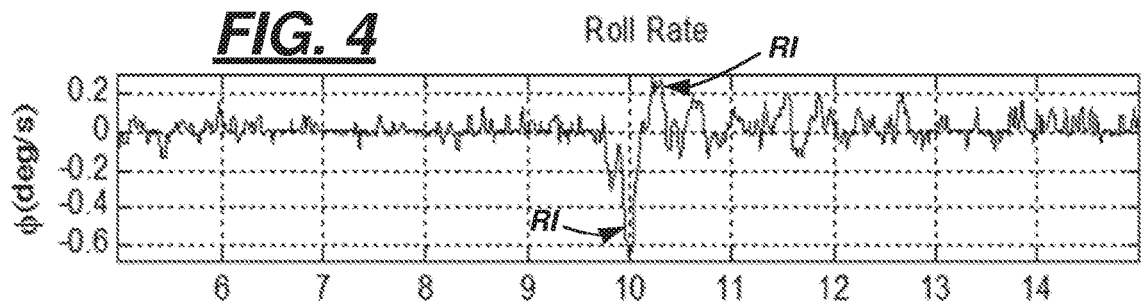
FIGS. 4-18 are graphical depictions of sensor data received by the computer from the one or more sensors.
Figure 5:
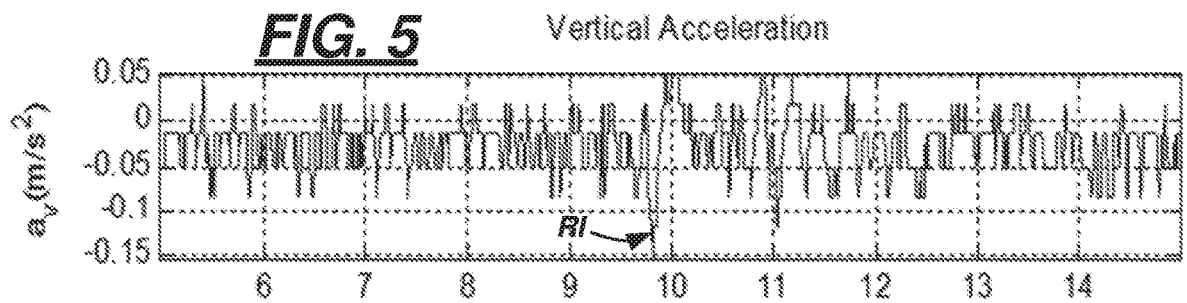
Figure 6:
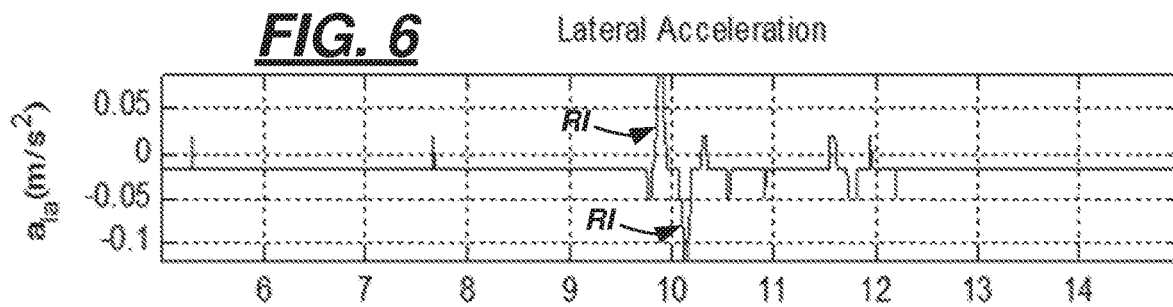
Figure 7:
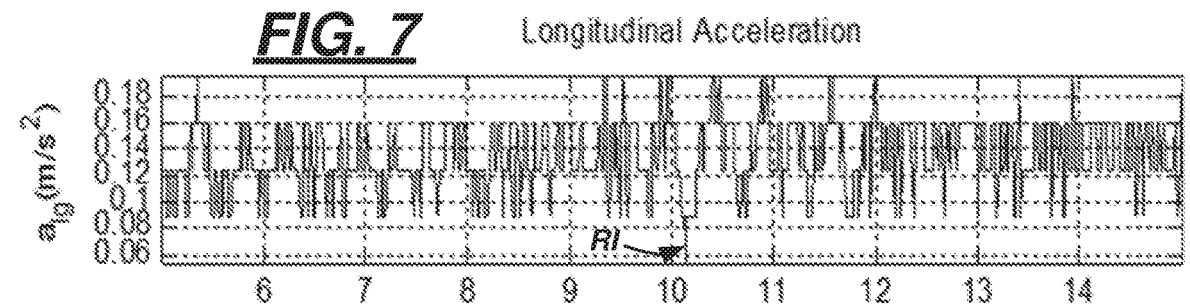
Figure 8:
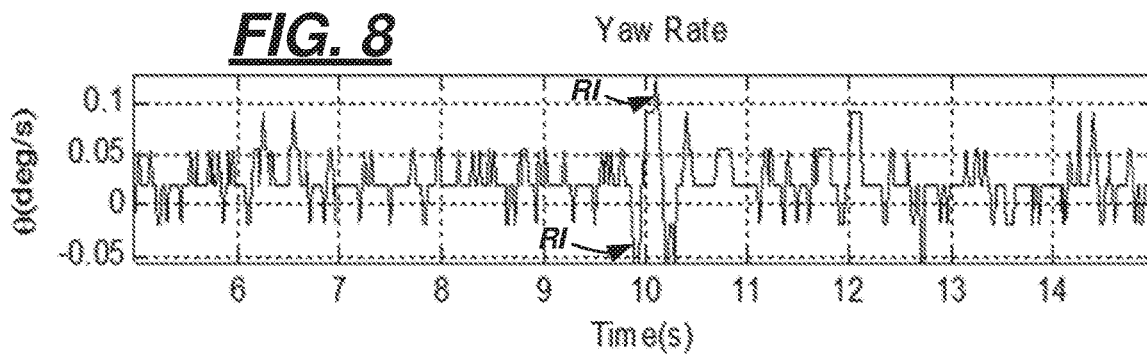

For purposes of illustration only, FIGS. 4-8 include sensor data from sensors 26-34 indicating a user ingressing the vehicle 12 from a left side (e.g., via doors D1 or D3). More particularly, FIG. 7 illustrates longitudinal acceleration data along the x-axis (received from sensor 26), FIG. 6 illustrates lateral acceleration data along the y-axis (received from sensor 28), FIG. 5 illustrates vertical acceleration data along the z-axis (received from sensor 30), FIG. 4 illustrates roll-rate data with respect to the x-axis (received from sensor 32), and FIG. 8 illustrates yaw-rate data with respect to the z-axis (received from sensor 34). Rotational indicators (RI) (e.g., voltage spikes) are labeled in FIGS. 4 and 8. It will be appreciated that axial acceleration data also may provide corresponding rotational indicators (RI) as shown in FIGS. 5-7. In one example of block 330, computer 14 may monitor and/or receive sensor data only from sensor 32—e.g., measuring roll-rate data along the vehicle longitudinal axis (x-axis). In other examples, computer 14 may use the sensor data from more than one of sensors 26-36.

In block 340 which follows block 330, the computer 14 may re-determine the state of the vehicle door (e.g., the same door of block 320)—e.g., whether it remains ajar. Continuing with the example set forth above, computer 14 may determine again whether the state of door D1 is ajar based on the sensor data from sensor 121 (e.g., whether the state remains a digital '1'). If computer 14 determines that the door remains ajar, then computer 14 loops back and repeats block 330 (e.g., continuing to receive and/or monitor sensor data—e.g., from sensor 32, or from sensor 32 and/or any combination of other sensors 26-30, 34-36). However, if computer 14 determines that the state of door D1 is closed (e.g., a digital '0') based on the sensor data from sensor 121, then process 300 proceeds to block 350.

When computer eventually does determine that the state of door D1 is closed, the receiving and/or monitoring of block 330 may ceases, and computer 14 may identify a time interval or window of interest with respect to the sensor data received and/or monitored in block 330. For example, the window of interest may include sensor data that was collected beginning with the state of door D1 being ajar until the state of door D1 being determined to be closed. It may be a continuous stream of analog data—or it could be sampled, filtered, and/or the like, as explained above. It will be appreciated that—for the purposes of the occupancy detection system 100—by ignoring sensor data from one or more of sensors 26-36 when each of the vehicle doors D1-D4 is closed, computer 14 may reduce the likelihood of false-positive traversal event determinations.

In block 350, computer 14 may determine an increased likelihood of a traversal event by determining whether at least one of the rotational indicators (RI) is greater than a first threshold (THR1) or less than a second threshold (THR2) during the window of interest. Thresholds THR1 and/or THR2 may be predetermined, stored in memory 24, and/or based on various criteria (e.g., such as vehicle criteria (e.g., vehicle make, model, suspension system, etc.) and/or vehicle user criteria (e.g., mass, size, etc.)). Further, the first and second thresholds THR1, THR2 may be unique to a particular vehicle door—e.g., THR1 for door D1 may differ that THR1 for door D3 (or door D2 or door D4), etc. Thus, in at least one example, computer memory 24 stores a number a different first and second thresholds.

More specifically, in block 350, if a rotational indicator (RI) is greater than threshold THR1 or less than threshold THR2, then process 300 may proceed to block 390. If the rotational indictor(s) (RI) associated with the window of interest are not greater than threshold THR1 or less than threshold THR2 (or no rotational indicators (RI) are determined in the window of interest at all), then process 300 may loop back and repeat block 310. For example, the absence of any rotational indicators (RI) during a window of interest might suggest a vehicle door D1-D4 was opened but no user traversed the door opening.

Figure 9:
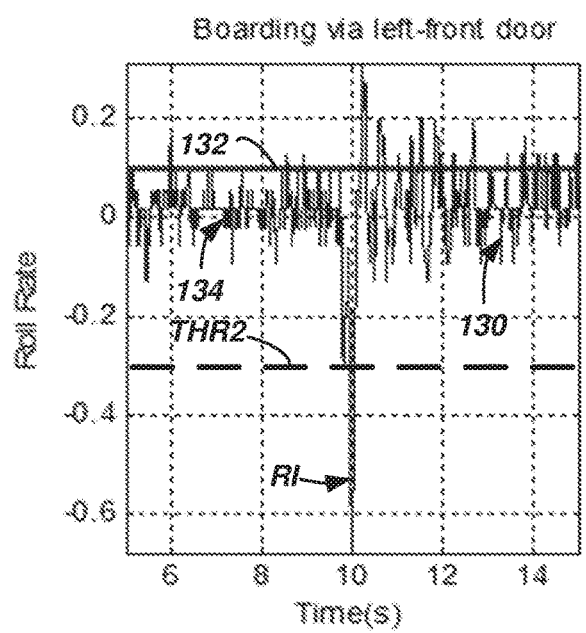
Figure 10:
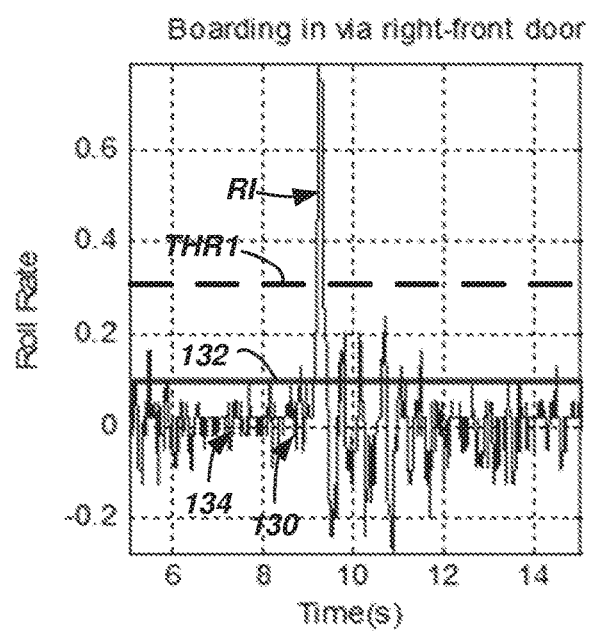
Figure 11:
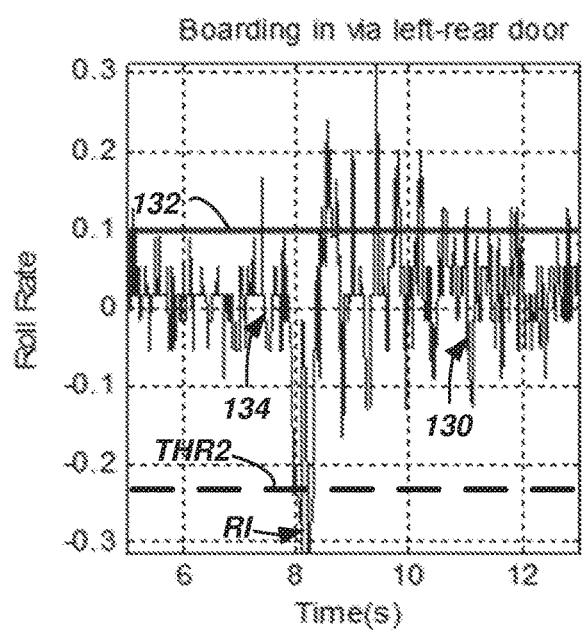
Figure 12:
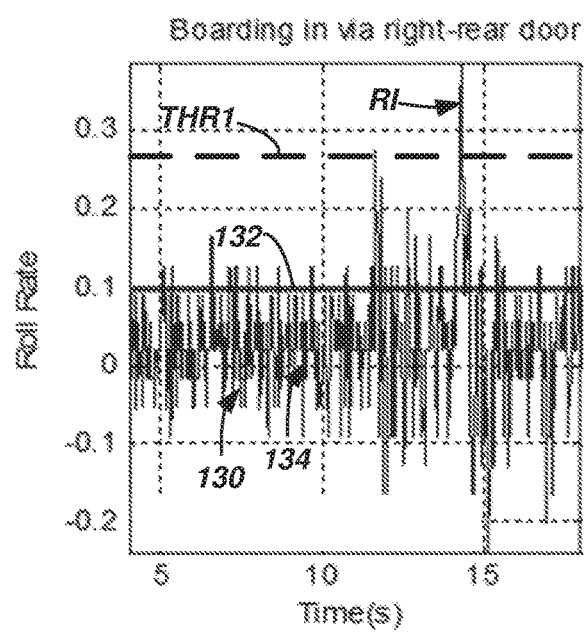

FIGS. 9-16 are examples illustrating rotational-rate data 130 from roll-rate sensor 32 for different conditions during exemplary windows of interest—e.g., when the respective door state was indicated to be ajar. In each figure, a digital signal 132 is shown indicating the window of interest (and overlapping the rotational-rate data 130). FIG. 9 illustrates rotational-rate data associated with an occupant ingressing via door D1, and a rotational indicator (RI) being less than a second threshold THR2. For purposes of illustration only, here THR2 is −0.30 Volts (V) (however, any value suitably larger than the system noise 134 (e.g., vehicle powertrain noise) may be used instead for door D1 or for any other vehicle door). FIG. 10 illustrates rotational-rate data associated with an occupant ingressing via door D2, and a rotational indicator (RI) being greater than a first threshold THR1. For purposes of illustration only, here THR1 is +0.30 Volts (V) (however, any value suitably larger than the system noise 134 may be used instead for door D2 or for any other vehicle door). FIG. 11 illustrates rotational-rate data associated with an occupant ingressing via door D3, and a rotational indicator (RI) being less than a second threshold THR2. And FIG. 12 illustrates rotational-rate data associated with an occupant ingressing via door D4, and a rotational indicator (RI) being greater than a first threshold THR1. With respect to the rotational-rate data shown in FIG. 12, it should be noted that the rotational indicator (RI) may not be as distinctive as the rotational indicators (RIs) shown in FIGS. 9-11 (e.g., the rotational indicator shown in FIG. 12 may have a lower signal-to-noise ratio). During the verification testing that included collecting the sensor data displayed in FIGS. 9-16, a vehicle seat inside of door D4 carried instrumentation equipment which interfered with the test occupant's ingress; had this equipment not been so located, it is anticipated that the SNR shown in FIG. 12 would be larger.

Figure 13:
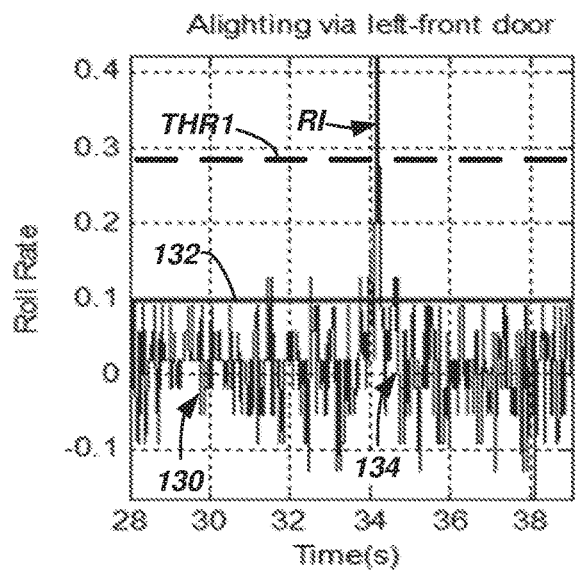
Figure 14:
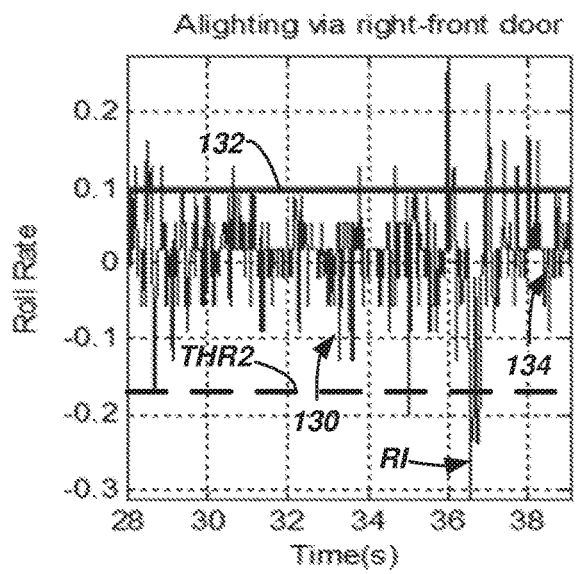
Figure 15:
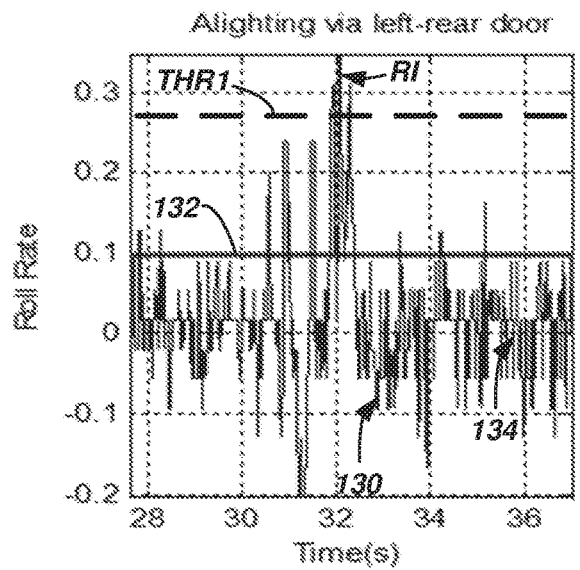
Figure 16:
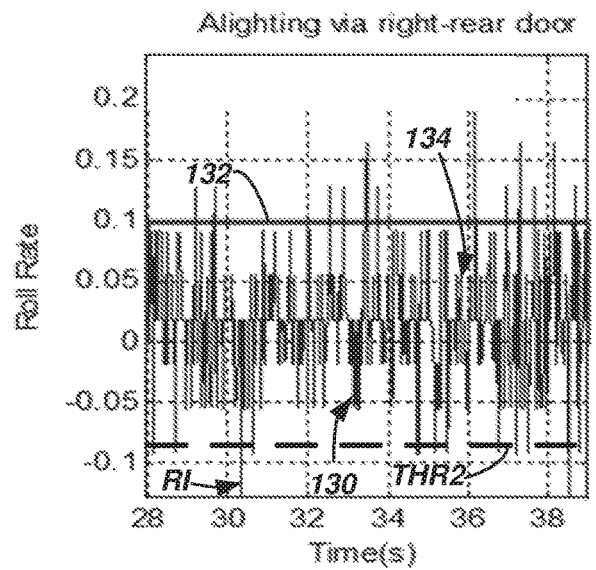

FIG. 13 illustrates rotational-rate data associated with an occupant egressing via door D1, and a rotational indicator (RI) being greater than a first threshold THR1. FIG. 14 illustrates rotational-rate data associated with an occupant egressing via door D2, and a rotational indicator (RI) being less than a second threshold THR2. FIG. 15 illustrates rotational-rate data associated with an occupant egressing via door D3, and a rotational indicator (RI) being greater than a first threshold THR1. And FIG. 16 illustrates rotational-rate data associated with an occupant egressing via door D4, and a rotational indicator (RI) being less than a second threshold THR2. Again, it is anticipated that the SNR shown in FIG. 16 may have been larger had the instrumentation equipment not been located in the seat adjacent door D4.

A summary of example scenarios determinable by computer 14 are set forth below in Table I that correspond with FIGS. 9-16. Consequently, computer 14 may determine whether a traversal event is an ingress event or an egress event using a respective door ajar signal (e.g., from sensors 121-124), a window of interest, one or more rotational indicators (RIs), and the first and second thresholds (THR1, THR2).

TABLE I

| Door-Ajar Sensor | Sensor Output | Rotational indicator value > THR1 | Rotational indicator value < THR2 | Result | See Also |
|---|---|---|---|---|---|
| sensor 121 (D1) (port side 42) | 1 | No | Yes | Ingress event | FIG. 9 |
| sensor 122 (D2) (starboard side 44) | 0 | — | — | — | |
| sensor 123 (D3) (port side 42) | 0 | — | — | — | |
| sensor 124 (D4) (starboard side 44) | 0 | — | — | — | |
| sensor 121 (D1) (port side 42) | 0 | — | — | — | |
| sensor 122 (D2) (starboard side 44) | 1 | Yes | No | Ingress event | FIG. 10 |
| sensor 123 (D3) (port side 42) | 0 | — | — | — | |
| sensor 124 (D4) (starboard side 44) | 0 | — | — | — | |
| sensor 121 (D1) (port side 42) | 0 | — | — | — | |
| sensor 122 (D2) (starboard side 44) | 0 | — | — | — | |
| sensor 123 (D3) (port side 42) | 1 | No | Yes | Ingress event | FIG. 11 |
| sensor 124 (D4) (starboard side 44) | 0 | — | — | — | |
| sensor 121 (D1) (port side 42) | 0 | — | — | — | |
| sensor 122 (D2) (starboard side 44) | 0 | — | — | — | |
| sensor 123 (D3) (port side 42) | 0 | — | — | — | |
| sensor 124 (D4) (starboard side 44) | 1 | Yes | No | Ingress event | FIG. 12 |
| sensor 121 (D1) (port side 42) | 1 | Yes | No | Egress event | FIG. 13 |
| sensor 122 (D2) (starboard side 44) | 0 | — | — | — | |
| sensor 123 (D3) (port side 42) | 0 | — | — | — | |
| sensor 124 (D4) (starboard side 44) | 0 | — | — | — | |
| sensor 121 (D1) (port side 42) | 0 | — | — | — | |
| sensor 122 (D2) (starboard side 44) | 1 | No | Yes | Egress event | FIG. 14 |
| sensor 123 (D3) (port side 42) | 0 | — | — | — | |
| sensor 124 (D4) (starboard side 44) | 0 | — | — | — | |
| sensor 121 (D1) (port side 42) | 0 | — | — | — | |
| sensor 122 (D2) (starboard side 44) | 0 | — | — | — | |
| sensor 123 (D3) (port side 42) | 1 | Yes | No | Egress event | FIG. 15 |
| sensor 124 (D4) (starboard side 44) | 0 | — | — | — | |
| sensor 121 (D1) (port side 42) | 0 | — | — | — | |
| sensor 122 (D2) (starboard side 44) | 0 | — | — | — | |
| sensor 123 (D3) (port side 42) | 0 | — | — | — | |
| sensor 124 (D4) (starboard side 44) | 1 | No | Yes | Egress event | FIG. 16 |

Figure 17:
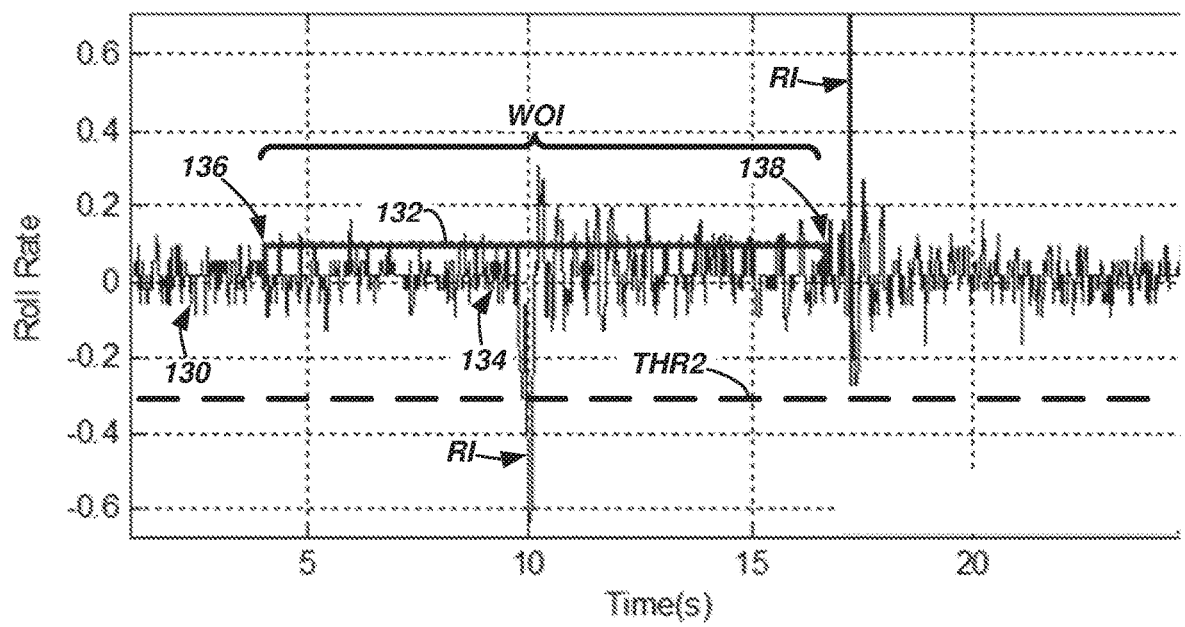
Figure 18:
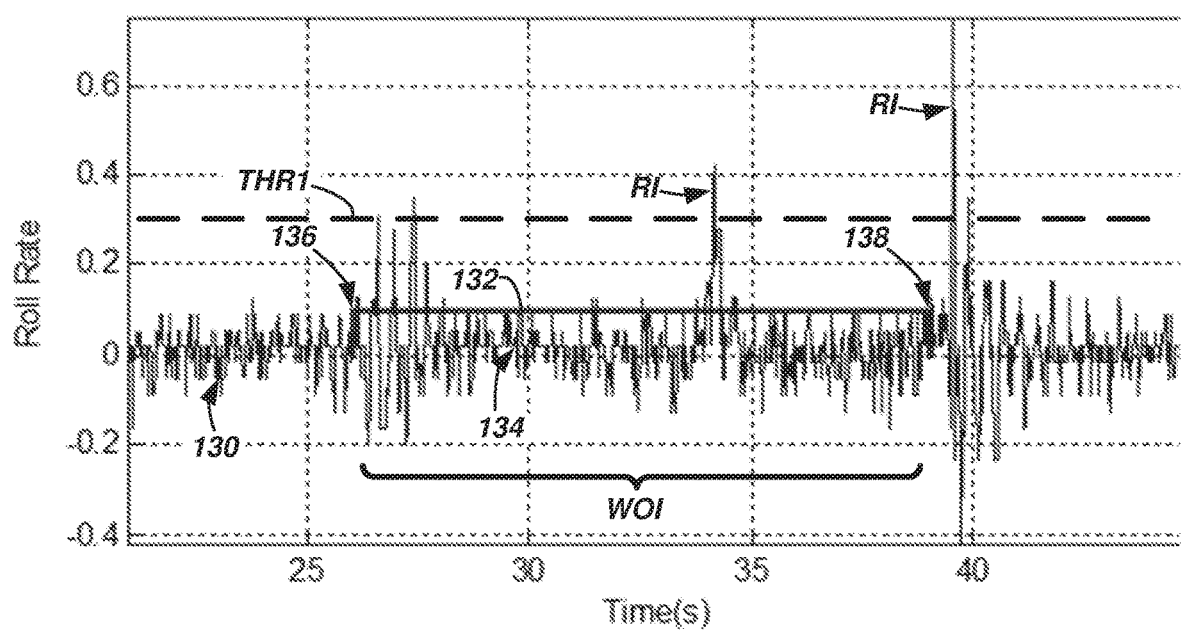

FIGS. 17 and 18 illustrate in greater detail aspects of FIGS. 9 and 13, respectively. For example, FIG. 17 shows the sensor data of sensor 32 before and after a window of interest (WOI). Further, FIG. 17 illustrates at least one rotational indicator (RI) that should be ignored by computer 14—e.g. based on its proximity and/or coincidence with respect to a beginning terminal point 136 (of the WOI) and/or an end terminal point 138 (of the WOI). That is, computer 14 may be programmed with instructions to ignore rotational indicators (RIs) outside of the window of interest (WOI) (e.g., before a beginning terminal point 136 and following an end terminal point 138), as well as rotational indicators (RIs) which occur within a threshold time interval thereof. For example, the rotational indicator (RI) that is near end terminal point 138 (in FIG. 17) may be a result of the door D1 being moved to a closed position. Thus, while the sensor data of sensor 32 may have resolution suitable for determining rotational rates associated with the weight of an occupant ingressing and/or egressing vehicle 12, it also may be suitably sensitive to detect impulses and/or other forces applied to vehicle 12 such as the shutting of a vehicle door. The threshold time interval may be +/−0.5 seconds of either terminal point 136, 138; of course, this is merely an example; other interval values may be used instead that are less than or greater than 0.5 seconds.

FIG. 18 portrays similar information (as shown in FIG. 17), except that the sensor data pertains to an occupant egressing the vehicle 12 via door D1 (e.g., see FIG. 13 and explanation above). Again, rotational indicators (RIs) which are determined by computer 14 to be either outside of the window of interest (WOI) and/or within a threshold time interval of the terminal points 136, 138 may be ignored. While not shown in FIGS. 17-18, sensor data may be received by computer 14 that includes instances of multiple rotational indicators (RIs) occur within a single window of interest (WOI)—wherein two or more occupants ingressed vehicle 12 during the window, or wherein two or more occupants egressed vehicle 12 during the window, or wherein one or more occupants ingressed and also one or more occupants egressed during the window, etc. By counting the rotational indicators (RIs) which are above the first threshold (THR1) and which are less than the second threshold (THR2) (as set forth, e.g., in Table I), computer 14 may determine the quantity of occupants within the vehicle 12 at any given time, as will be explained below.

Before describing an example of block 390 in process 300 (FIG. 3), block 360 will be described. In at least one example, block 360 may follow block 320 as well (e.g., following a determination by computer 14 that a vehicle door is ajar). Thus, the instructions associated with blocks 360-380 may occur at least partially concurrently with respect to the execution of instructions associated with blocks 330-350.

Block 360 may be similar to block 330 described above; therefore, it will not be re-described in great detail. In at least one example of block 360, computer 14 receives data from at least sensor 30 (e.g. measuring movement along the z-axis), sensor 32 (e.g., measuring roll-rate with respect to the x-axis), and sensor 36 (e.g., measuring pitch-rate with respect to the y-axis). Sensor data from any combination of other sensors (e.g., sensors 26, 28, or 34) may be used as well in other examples.

Following block 360, process 300 proceeds to block 370. In at least one example, block 370 may be identical to block 340; therefore, it will not be re-described herein. When in block 370, computer 14 determines that the door (e.g., door D1) is no longer ajar, then the process proceeds to block 380. When block 370 determines that the door (e.g., D1) of block 320 remains ajar, process 300 may loop back and repeat block 360 (e.g., continue to receive and/or monitor sensor data—e.g., from any combination of sensors 30-36).

In block 380, computer 14 determines whether a weight indicator (WI) is greater than a third threshold (THR3); this will be described in detail below. The weight indicator (WI) may be associated with the weight of an occupant that is ingressing or egressing vehicle 12. As an occupant (or vehicle user) may be presumed to have a minimum or threshold weight, the weight indicator (WI) may be used in one example to mitigate false-positive determinations of a traversal event. For example, if the weight indicator (WI) exceeds the threshold (THR3), then process 300 proceeds to block 390. If the weight indicator (WI) is less than or equal to the third threshold (THR3), then process 300 may loop back and repeat the process 300 from the beginning (e.g., loop back to block 310).

According to block 380, computer 14 may be programmed to determine a traversal event (e.g., an occupant ingress or egress event) by executing dynamic vehicle model instructions stored in memory 24. This model may be used to affirm or corroborate the determination made in block 350, or it may be used as a stand-alone process to determine a traversal event. As will be explained below, in at least the illustrated example, it is used to corroborate a positive determination in block 350 (e.g., as block 390 may require block 350 and block 380 to be true to proceed to block 400).

Figure 19:
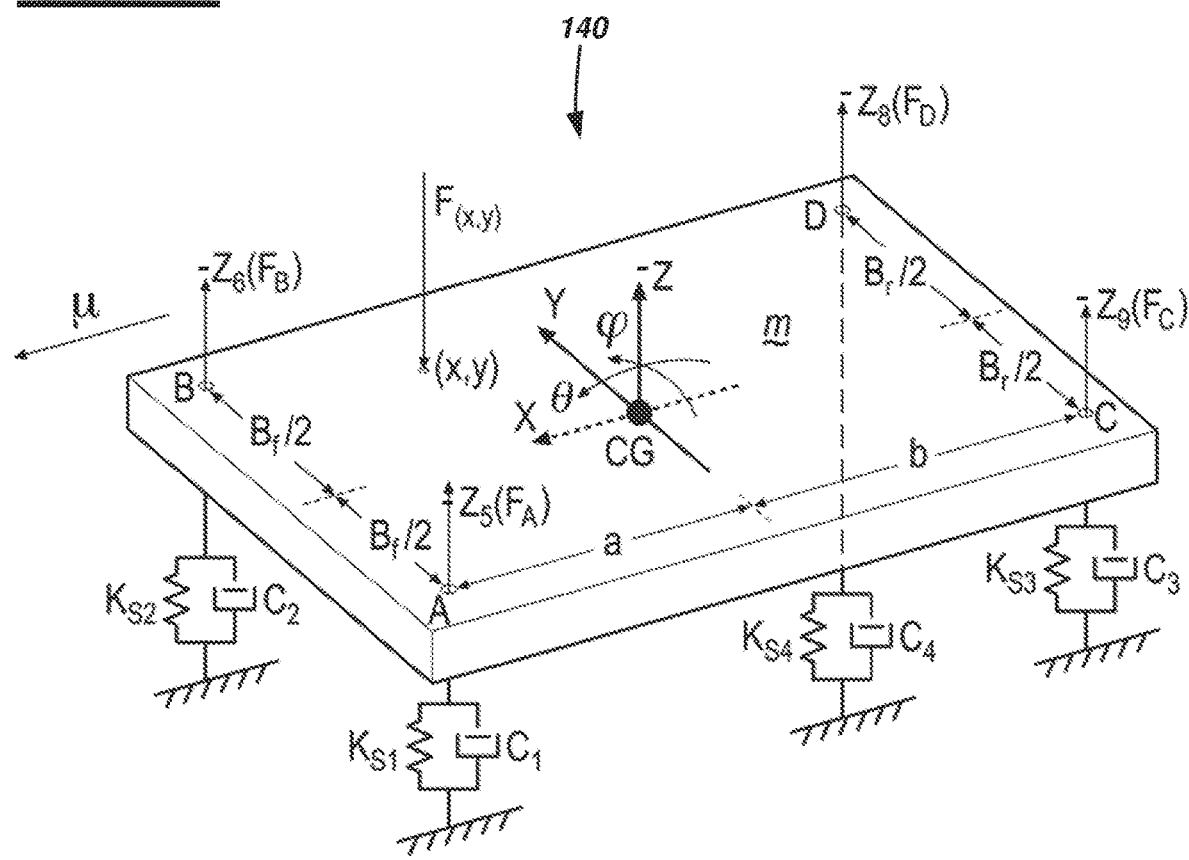
FIG. 19 is a model that can be used by the computer to determine an occupant traversal event.
Figure 20:
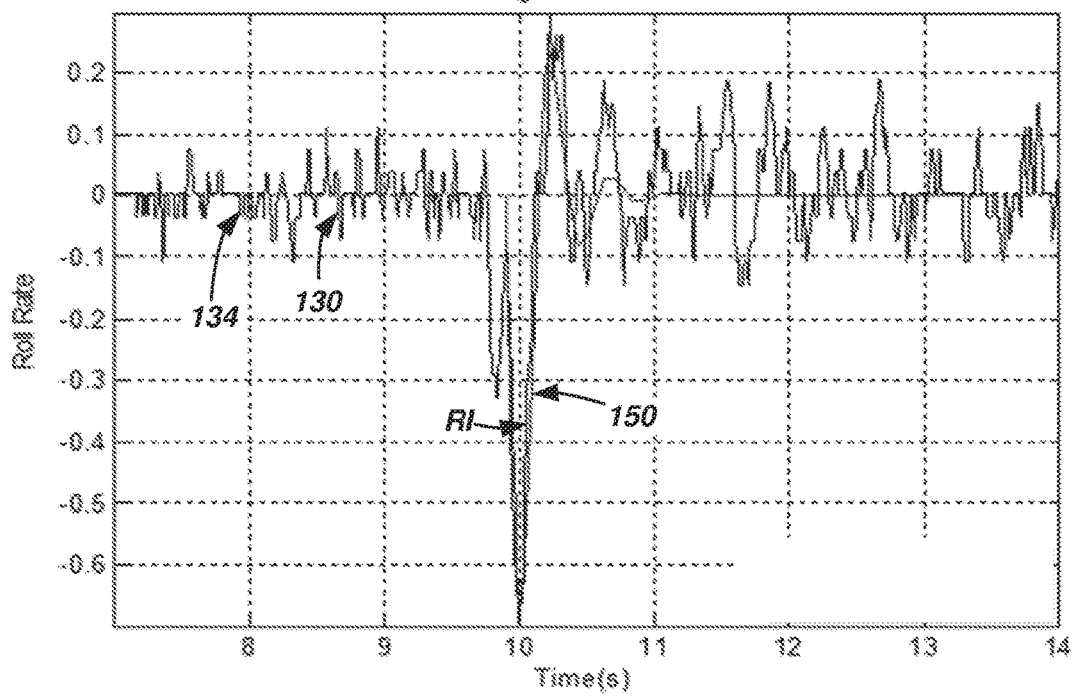
FIGS. 20-25 illustrate outputs from the computer upon execution of instructions associated with the model shown in FIG. 19.
Figure 21:
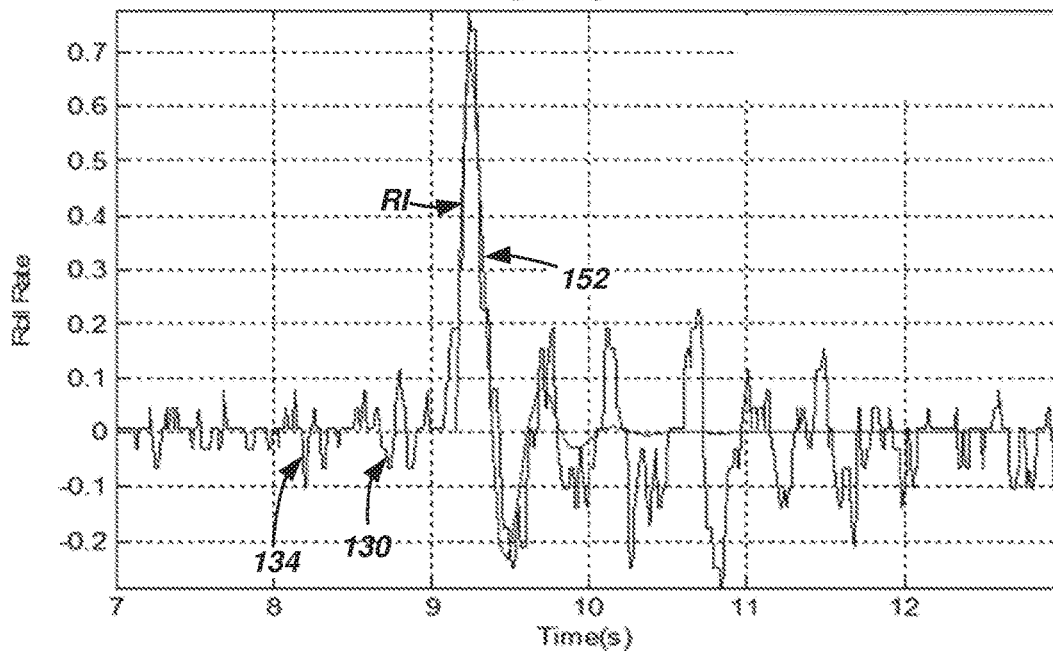
Figure 22:
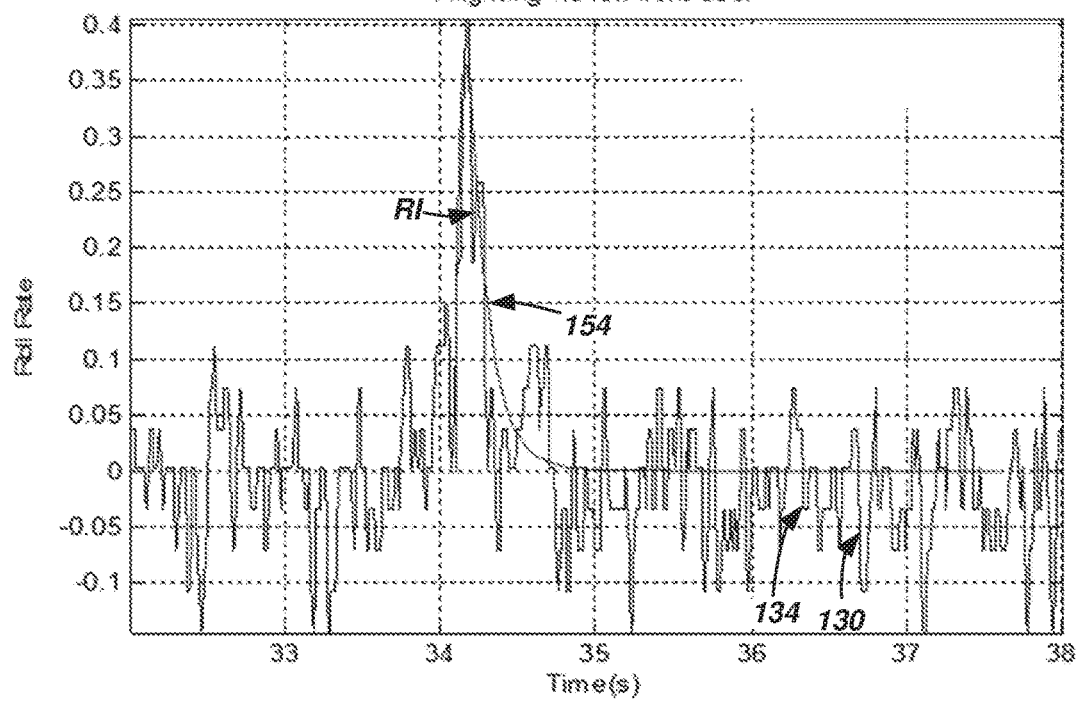
Figure 23:
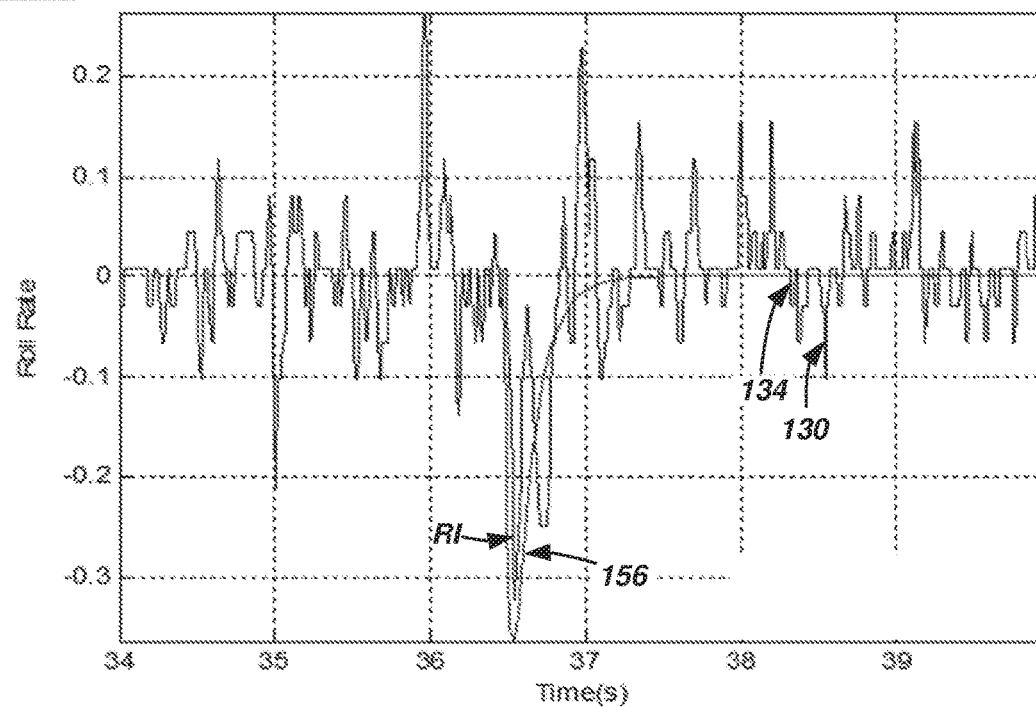

In the description that follows, at least a portion of the model instructions may be implemented using Matlab Simulink™; however, this is merely one example. Of course, other modeling techniques may be used instead. In FIG. 19, a schematic diagram of a vehicle model 140 is shown, wherein mass m represents a mass of vehicle 12—e.g., vehicle 12 being modeled with three degrees of freedom (e.g., translation (Z) along the z-axis, rotation (φ) about the x-axis (roll), and rotation (θ) about the y-axis (pitch)). In the corners of the model 140, predetermined locations A, B, C, and D are shown, wherein segment AB (e.g., distance $B_f$, or $B_f/2 + B_f/2$) corresponds to the front side 46 of vehicle 12 and segment CD (e.g., distance $B_r$, or $B_r/2 + B_r/2$) corresponds to rear side 48 of vehicle 12 (e.g., thus, segment AC (e.g., distances a and b, or a+b) corresponds to port side 42 and segment BD (also e.g., distance a+b) corresponds to starboard side 44).

The model 140 shown in FIG. 19 also may include a vertical force F(x,y) that may be applied to vehicle 12 by an ingressing or egressing occupant within the bounds defined by locations A, B, C, and D. Vertically-directed forces (e.g., corresponding to the vehicle tires and suspension system) are modeled as well—namely, forces $F_A$ along axis–$z_5$, $F_B$ along axis–$z_6$, $F_C$ along axis–$z_9$, and $F_D$ along axis–$z_8$, respectively, wherein axes–$z_5$, –$z_6$, –$z_8$, and –$z_9$ are parallel to the z-axis.

The model can be governed by exemplary Equations (1)-(7).

$$m \cdot \ddot{Z} = F_A + F_B + F_C + F_D - F \quad \text{Equation (1).}$$

$$I_\theta \cdot \ddot{\theta} = b(F_C + F_D) - a(F_A + F_B) + x \cdot F \quad \text{Equation (2).}$$

$$I_\varphi \cdot \ddot{\varphi} = B_r/2 \cdot (F_C - F_D) + B_f/2 \cdot (F_A - F_B) + y \cdot F \quad \text{Equation (3).}$$

$$F_A = K_{s1}(-Z_5) + C_1(-\dot{Z}_5) \quad \text{Equation (4).}$$

$$F_B = K_{s2}(-Z_6) + C_2(-\dot{Z}_6) \quad \text{Equation (5).}$$

$$F_C = K_{s3}(-Z_9) + C_3(-\dot{Z}_9) \quad \text{Equation (6).}$$

$$F_D = K_{s4}(-Z_8) + C_4(-\dot{Z}_8) \quad \text{Equation (7).}$$

In the equations above, $\ddot{Z}$ is the axial acceleration along the z-axis, and $\dot{Z}$ (e.g., $-\dot{Z}_5$, $-\dot{Z}_6$, $-\dot{Z}_9$, $-\dot{Z}_8$) pertain to axial velocities with respect thereto. $I_\theta$ and $I_\varphi$ are instantaneous moments of inertia about the y-axis (pitch moment of inertia) and x-axis (roll moment of inertia), respectively—while $\ddot{\theta}$ and $\ddot{\varphi}$ are angular accelerations about the y- and x-axes, respectively. Further, $K_{S1}$, $K_{S2}$, $K_{S3}$, and $K_{S4}$ may be spring constants associated with the vehicle tires and vehicle suspension system, and $C_1$, $C_2$, $C_3$, and $C_4$ may be damping constants associated with the vehicle tires and vehicle suspension system. Both spring and damping constants are known in the art; these constants may be any suitable values. Locations x and y may define the location of at which force F is applied. Exemplary values of x and y are shown in Table II below. These particular locations may correspond with four different vehicle seats in a test vehicle (e.g., such as vehicle 12) which may be used to generate the sensor data which was previously illustrated (e.g., FIGS. 4-18).

TABLE II

| Coordinate | x | y |
|---|---|---|
| Front-left | 0.1 | −0.5 |
| Front-right | 0.1 | 0.5 |
| Left-rear | −1.3 | −0.5 |
| Right-rear | −1.3 | 0.5 |

Tables III and IV set forth some illustrative values for some of the other parameters of Equations (1)-(7). It should be appreciated that these parameters could equal or approximate the corresponding parameters of the test vehicle described above; hence, these parameters are merely examples to illustrate how the dynamic model instructions operate; other suitable parameters may be used instead.

TABLE III

| Parameter | Value |
|---|---|
| Front track ($B_f$) | 1.6667 (m) |
| Rear track ($B_r$) | 1.6708 (m) |
| CG to front axle a | 1.1752 (m) |
| CG to rear axle b | 1.6898 (m) |
| Stiffness of front-left suspension $K_{s1}$ | 100 (KN/m) |
| Stiffness of front-right suspension $K_{s2}$ | 100000 (N/m) |
| Stiffness of rear-left suspension $K_{s3}$ | 100 (KN/m) |
| Stiffness of right-rear suspension $K_{s4}$ | 100000 (N/m) |
| Roll moment of inertia | 1500 (kg · m^2) |
| Curb weight (m) | 2110 (kg) |
| Pitch moment of inertia | 4321 (kg · m^2) |

TABLE IV

| Movement | Damping ratio of left front suspension | Damping ratio of right-front suspension | Damping ratio of left-rear suspension | Damping ratio of right- rear suspension |
|---|---|---|---|---|
| Location | $C_1$ | $C_2$ | $C_3$ | $C_4$ |
| Ingressing (so-called 'jounce') | 4500 (N · s/m) | 4500 (N · s/m) | 4500 (N · s/m) | 4500 (N · s/m) |
| Egressing (so-called 'rebound') | 16000 (N · s/m) | 16000 (N · s/m) | 16000 (N · s/m) | 16000 (N · s/m) |

Using Matlab, response curves 150, 152, 154, 156 shown in FIGS. 20-23, respectively, were generated using the dynamic model instructions and parameters set forth above to establish that, if computer 14 executed similar instructions (e.g., in accordance with block 380 of process 300), computer 14 could determine whether a user ingressed or egressed the vehicle 12. In FIGS. 20-23, the generated response curves 150-156 overlay the rotational indicators (RIs) within the sensor data received via roll-rate sensor 32.

According to one example, the model instructions exemplified above may be used to derive transfer function equations from a roll-rate response of the vehicle body 12 based on an occupant weight (modeled as a step input), as shown in Equations (8) and (9). In the instant example, these two equations may pertain to door D2; however, these equations are merely examples. Similar-derived transfer function equations may be determined by computer 14 for an occupant ingressing or egressing other doors (e.g., D1, D3, D4, etc.).

$$\frac{\varphi(s)}{W(s)} = \frac{0.0003333s}{s^2 + 8.354s + 185.6}, \text{ingressing} \quad \text{Equation (8)}$$

$$\frac{\varphi(s)}{W(s)} = \frac{-0.0003333s}{s^2 + 29.7s + 185.6}, \text{egressing.} \quad \text{Equation (9)}$$

Equations (8) and (9) can be a Laplace transformation of the roll-rate signal $\varphi(t)$, and W(s) can be a Laplace transformation of the occupant weight. According to one example of the model instructions, if a starting time is set at time (t)=0, then a step response using Equations (8) and (9) can be expressed as Equation (10), wherein $\gamma(t)$ may be defined as $$\gamma(t) = \begin{cases} 1, & t > 0 \\ 0, & t < 0 \end{cases}$$

and wherein, during ingress, a=0.0003333, b=8.354, and c=185.6, and wherein, during egress, a=−0.0003333, b=29.7, c=185.6.

$$\varphi(t) = 2\frac{a}{\sqrt{4c - b^2}} e^{\frac{-b}{2}t} \sin\left(\frac{\sqrt{4c - b^2}}{2}t\right) \gamma(t). \quad \text{Equation (10)}$$

Figure 24:
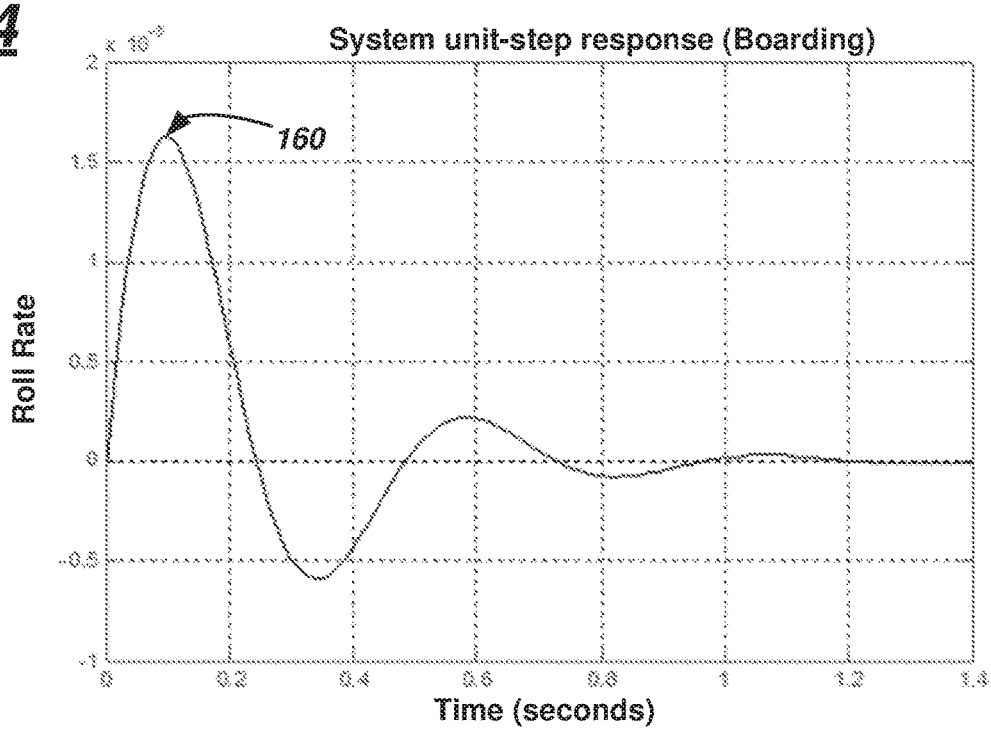
Figure 25:
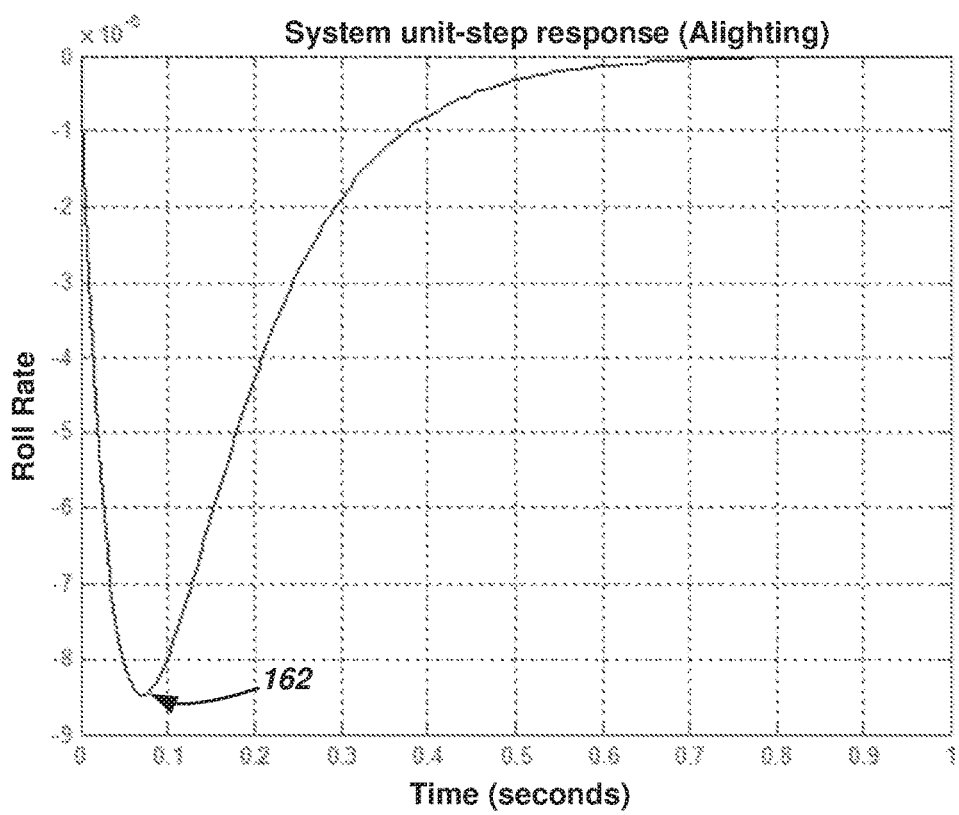

An occupant's weight (W) (e.g., the magnitude of the respective step inputs as shown in FIGS. 24-25) may be identified by applying the homogeneity of linear-time-invariant systems. FIG. 24 illustrates a step response 160 of an occupant ingressing via door D2, per the transformations described above. And FIG. 25 illustrates a step response 162 of an occupant egressing via door D2, per the transformations described above. The properties of linear-time-invariant systems are generally known to skilled artisans; therefore, these will not be discussed herein. Thus, in at least this example (e.g., for a particular door), the magnitude (e.g., weight indicator, WI) may be defined by Equation (11).

$$WI = \frac{\Psi(deg/s)}{57 \cdot \omega(rad/s)} \cdot \frac{1}{9.8}, \quad \text{Equation (11)}$$

where $\Psi$ may be a maximum among absolute values of roll-rate which is obtainable from the test vehicle, wherein $\omega$ may be a maximum among absolute values of roll-rate but calculated using Equation (10). Of course again, Equations (8)-(11) may pertain to an occupant ingressing or egressing via door D2, but computer 14 may derive and utilize similar equations for an occupant weight indicator (WI) associated with an occupant that ingresses or egresses via one of the other doors D1, D3-D4, etc.

Once the weight indicator (WI) is determined, in block 380 (FIG. 3), computer 14 may compare it to the predetermined third threshold (THR3). And as described above, if the weight indicator (WI) is greater than threshold (THR3), then process 300 may proceed to block 390. If the weight indicator (WI) is less than or equal to the third threshold (THR3), then process 300 may loop back and repeat block 310.

In block 390, if both the weight indicator (WI) is greater threshold (THR3) and the rotational indicator determined in block 350 is at least one of: greater than a first threshold (THR1) or less than a second threshold (THR2), then process 300 proceeds to block 400. Block 390 may ensure that the rotational indicator (RI) loop of process 300 is not completed without also completing the weight indicator (WI) loop as well, or vice-versa. Thus, if both the rotational and weight indicators do not indicate a traversal event, the process 300 accordingly proceeds to either block 330 or block 350 from block 390 to complete the analysis.

In block 400, computer 14 may increment or decrement a previously-initialized counter. The counter may comprise programming logic and/or instructions stored in memory 24, or may be implemented as a circuit, just to name a couple non-limiting examples. During initialization, the counter may be set to zero (0); initialization may occur, e.g., at a manufacturing facility or authorized service center. Thus, for example, when an ingress event is determined, the counter may increment by one (1). And when an egress event is determined, the counter may decrement by one (1). Of course, in some instances, the counter may be increment or decrement by more than one (as explained above—e.g., if multiple rotational indicators (RIs) so indicate, as do the weight indicator(s) (WIs)). Other suitable increments and decrements are also possible.

Table V below illustrates one example of incrementing and decrementing based on one example of vehicle 12, wherein vehicle 12 includes four doors D1-D4 leading to four adjacently-located vehicle seats (e.g., namely, a front-left seat, a rear-left seat, a front-right seat, and a rear-right seat). The table shows that if an ingress or egress is determined by computer 14 relative to one of these doors, then computer 14 may increment+1 or −1, accordingly.

TABLE V

| Location | Sign of the Peak Roll Rate | |
| --- | --- | --- |
| | Positive | Negative |
| Front-left position/ Rear-left position | Egressing (−1) | Ingressing (+1) |
| Front-right position/ Rear-right position | Ingressing (+1) | Egressing (−1) |

Following block 400, process 300 may loop back to block 310 and continue to monitor sensor data from the vehicle sensors 26-36, 121-124, as previously described. Alternatively, process 300 may end.

It should be appreciated that process 300 may be carried out when the vehicle ignition state is ON or OFF. In this manner, the computer counter may keep track of the quantity of occupants in either state. Further, it should be appreciated that the counter may reset by the computer 14 at any suitable time—e.g., including by authorized service personnel or even when other vehicle data indicates to computer 14 that the vehicle cabin 16 is empty of occupants. For example, if a camera or other imaging device determines the cabin 16 is empty (and the counter of computer 14 indicates that the cabin 16 is occupied by at least one user), then computer 14 may reset the counter. Other suitable reset implementations also exist.

In other examples, computer 14 may determine a traversal event and/or count occupants without determining both a rotational indicator (RI) and a weight indicator (WI). In at least one exemplary process, only one of the rotational or weight indicators may be determined. For example, determination of the other indicator may be omitted.

In another example, the rotational indicator(s) (RI) may be determined, and then the weight indicator (WI) may be determined—e.g., in sequence. Or this sequence could be reversed. Still other examples exist as well.

In at least some examples, the determination by computer 14 of occupant detection, occupant quantity, determinations of occupants' weights, etc. can be used to improve motion performance of the vehicle. Or this type of information can be used to improve vehicle fuel economy (e.g. by providing the information to a real-time calibration system of a vehicle powertrain system). Or this type of information can be used to improve vehicle emergency services (e.g. by providing the information to a vehicle collision alert system—e.g., in response to a collision or crash). Further, this type of information may be used to alert one or more occupants when an occupant is left or otherwise remains in the vehicle (e.g., once the vehicle has reached its destination—e.g., in taxi implementations). These are merely examples; other examples exist as well.

Thus, there has been described an occupant detection system for a vehicle. The system includes a computer that receives sensor data from one or more vehicle sensors. The sensors may include at least one rotational-rate sensor. Using sensor data, the computer is programmed to determine whether an occupant ingressed or egressed the vehicle. Thereafter, the computer may increment or decrement a counter, as appropriate.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Linux operating system, and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a server, or some other computing system and/or device.

Computing devices generally include computer-executable instructions, where the instructions may be executable by one or more computing devices such as those listed above. Computer-executable instructions may be programmed as an embedded software which can be run in a so-called real-time operating system. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. As described below, the processor instructs vehicle components to actuate in accordance with the sensor data. The processor may be incorporated into a controller from an electronic control unit.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, programmed to:
   receive an indication that a vehicle door is ajar;
   receive sensor data from a rotational-rate sensor in a vehicle;
   based on the indication that the vehicle door is ajar, determine a window of interest with respect to the sensor data, wherein the window of interest is defined by a time interval associated with when the vehicle door is ajar; and
   determine a traversal event based on the rotational-rate sensor data received within the window of interest, wherein the traversal event includes one of an occupant ingress event or an occupant egress event.

2. The computer of claim 1, wherein the indication comprises sensor data received via another sensor located at the door.

3. The computer of claim 1, wherein the indication is received from a body control module coupled to a plurality of door-ajar sensors, wherein each door-ajar sensor is associated with one of a plurality of vehicle doors.

4. The computer of claim 1, wherein the sensor data is received by the computer in response to the indication.

5. The computer of claim 1, wherein the computer further is programmed to determine a rotational indicator from the sensor data, wherein the rotational indicator is indicative of the traversal event.

6. The computer of claim 5, wherein the computer further is programmed to determine the traversal event based on the rotational indicator being greater than a first threshold or less than a second threshold.

7. The computer of claim 1, wherein the computer further is programmed to ignore a rotational indicator from the rotational-rate sensor data that is indicative of the traversal event when the rotational indicator is coincident with a terminal point of the window of interest or when the rotational indicator is within a threshold time interval of the terminal point.

8. The computer of claim 1, wherein the rotational-rate sensor is positioned and oriented in the vehicle to measure roll-rate of the vehicle with respect to a longitudinal axis thereof.

9. The computer of claim 1, wherein the computer further is programmed to: receive sensor data from a second rotational-rate sensor and an accelerometer; and execute dynamic vehicle model instructions using sensor data from the first rotational-rate sensor, the second rotational-rate sensor, and the accelerometer.

10. The computer of claim 9, wherein the computer further is programmed to: determine a weight indicator using the model instructions; determine whether the weight indicator is greater than a threshold; and determine the traversal event when the weight indicator is greater than the threshold.

11. The computer of claim 9, wherein the first rotational-rate sensor is positioned and oriented in the vehicle to measure roll-rate of the vehicle with respect to a longitudinal axis thereof, wherein the second rotational-rate sensor is positioned and oriented in the vehicle to measure pitch-rate of the vehicle with respect to a lateral axis thereof, wherein the accelerometer is positioned and oriented in the vehicle to measure movement along a vertical axis of the vehicle.

12. The computer of claim 1, wherein the computer further is programmed to increment or decrement a counter based on determining the traversal event, wherein, when the computer determines the occupant ingress event, the computer is programmed to increment the counter, and wherein, when the computer determines the occupant egress event, the computer is programmed to decrement the counter.

13. The computer of claim 1, wherein the sensor is part of a roll stability control system in the vehicle.

14. A system, comprising:
a first rotational-rate sensor, wherein the first rotational-rate sensor is associated with a motion sensing system in a vehicle; and
a computer, programmed to:
receive an indication that a vehicle door is ajar;
receive sensor data from the first rotational-rate sensor;
based on the indication that the vehicle door is ajar, determine a window of interest with respect to the sensor data, wherein the window of interest is defined by a time interval associated with when the vehicle door is ajar; and
determine a traversal event based on the rotational-rate sensor data received within the window of interest, wherein the traversal event includes one of an occupant ingress event or an occupant egress event.

15. The system of claim 14, further comprising a door-ajar sensor associated with one of a plurality of vehicle doors, wherein the indication is received by the computer via the door-ajar sensor.

16. The system of claim 14, wherein the computer further is programmed to determine a rotational indicator from the rotational-rate sensor data, wherein the rotational indicator is indicative of the traversal event.

17. The system of claim 16, wherein the computer further is programmed to determine the traversal event based on the rotational indicator being greater than a first threshold or less than a second threshold.

18. The system of claim 14, wherein the first rotational-rate sensor is positioned and oriented in the vehicle to measure roll-rate of the vehicle with respect to a longitudinal axis thereof, wherein the motion sensing system further comprises a second rotational-rate sensor and an accelerometer, wherein the second rotational-rate sensor is positioned and oriented in the vehicle to measure pitch-rate of the vehicle with respect to a lateral axis thereof, wherein the accelerometer is positioned and oriented in the vehicle to measure movement along a vertical axis of the vehicle.

19. The system of claim 18, wherein the computer further is programmed to: receive sensor data from the second rotational-rate sensor and the accelerometer; and execute dynamic vehicle model instructions using sensor data from the first rotational-rate sensor, the second rotational-rate sensor, and the accelerometer, wherein the computer further is programmed to: determine a weight indicator using the model instructions; determine whether the weight indicator is greater than a threshold; and determine the traversal event when the weight indicator is greater than the threshold.

20. The system of claim 14, wherein the computer further is programmed to ignore a rotational indicator from the sensor data that is indicative of the traversal event when the rotational indicator is coincident with a terminal point of the window of interest or when the rotational indicator is within a threshold time interval of the terminal point.

\* \* \* \* \*